United States Patent [19]
Berghs et al.

[11] Patent Number: 5,353,217
[45] Date of Patent: Oct. 4, 1994

[54] CONTROL SYSTEM WITH PILOT CONTROLLER, ESPECIALLY FOR A ROLL STAND

[75] Inventors: Andre Berghs, Neunkirchen a/Br.; Hans-Peter Tröndle, Forchheim; Peter Hopf, Nürnberg; Georg Bytomski, Baiersdorf; Hans-Joachim Felkl, Esslingen, all of Fed. Rep. of Germany

[73] Assignee: Siemens Aktiengesellschaft, Munich, Fed. Rep. of Germany

[21] Appl. No.: 21,703

[22] Filed: Feb. 24, 1993

[30] Foreign Application Priority Data

Feb. 24, 1992 [EP] European Pat. Off. ........ 92103082.1

[51] Int. Cl.$^5$ ...................... G05B 13/04; G06F 15/46
[52] U.S. Cl. .................................... 364/149; 364/150; 364/472
[58] Field of Search ............... 364/148, 149, 472, 177, 364/578, 161, 150; 72/200

[56] References Cited

U.S. PATENT DOCUMENTS

| | | |
|---|---|---|
| 4,646,226 | 2/1987 | Moon .................................. 364/149 |
| 4,674,029 | 6/1987 | Maudal ................................ 364/148 |
| 5,036,265 | 7/1991 | Weihrich et al. ................... 318/618 |

FOREIGN PATENT DOCUMENTS 3346179 7/1985 Fed. Rep. of Germany.

OTHER PUBLICATIONS

Proceedings of the 1990 American Control Conference, vol. 2, May 1990, P. M. Sain; M. K. Sain: On Coordinated Feedforward Exitation of Nonlinear Servomechanism, pp. 1695–1700.

Primary Examiner—Paul Gordon
Attorney, Agent, or Firm—Kenyon & Kenyon

[57] ABSTRACT

In a control system, especially a hydraulic screw-down control system for a roll stand, the controller output is acted upon by a pilot control value ($v_1^*$). At the same time, a reference value ($x_M'$) is delivered to the controller via a subtractor as a setpoint value. The reference value ($x_m'$) is determined in a model control loop based on the pilot controller. Parasitic response characteristics of the overall system are largely accounted for in the model control loop, so that on a time-averaged basis the controller is not activated.

25 Claims, 3 Drawing Sheets

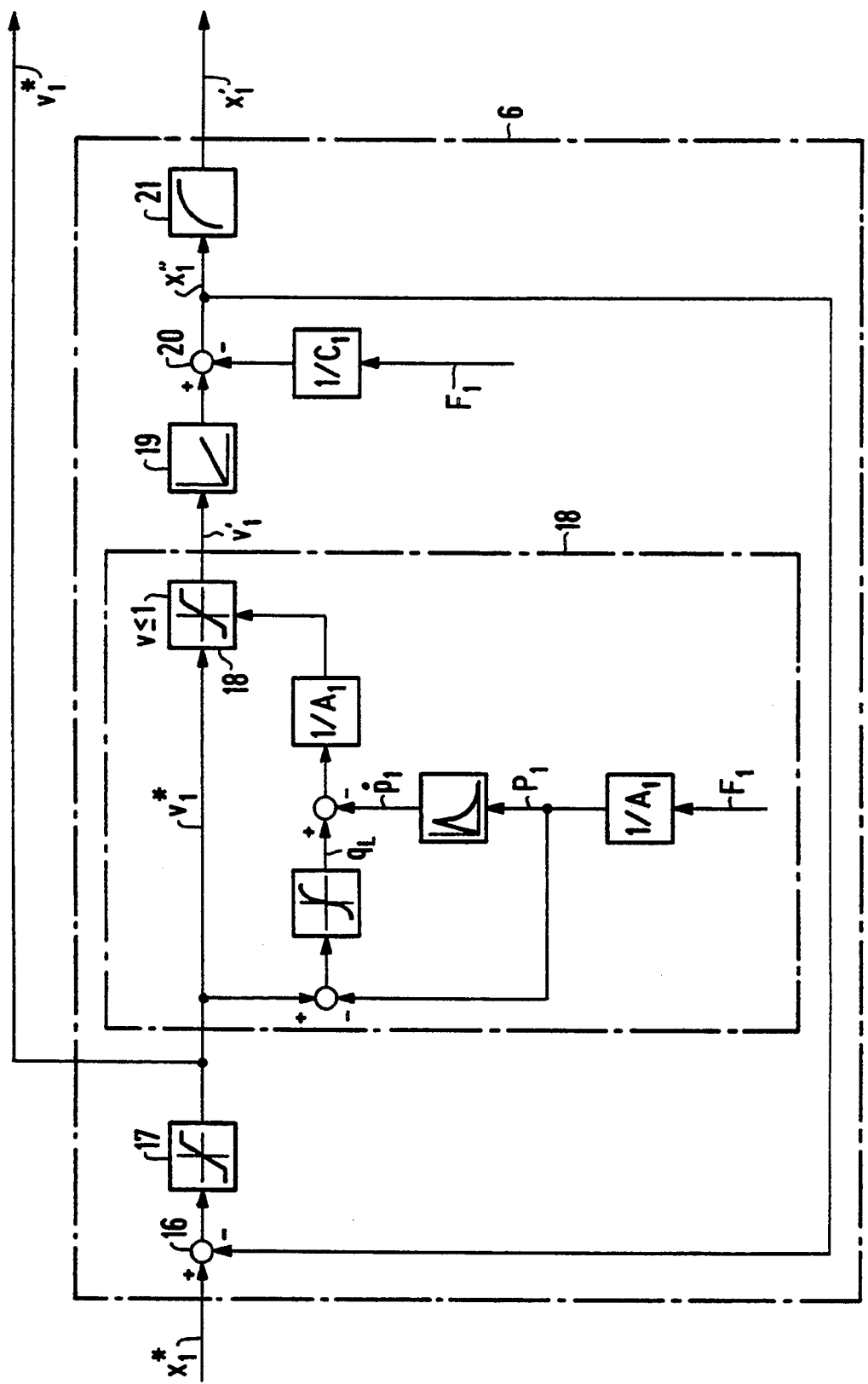

CONTROL SYSTEM WITH PILOT CONTROLLER, ESPECIALLY FOR A ROLL STAND

BACKGROUND OF THE INVENTION

The present invention relates to a control system, and in particular, to a hydraulic screw-down control system, for example for a roll stand, that includes at least one controller and at least one actuator. A setpoint value and an actual value are input to the controller. Based on these input values the controller determines a controller manipulated variable, applies a pilot control value to the controller manipulated variable, and supplies the resulting value to the actuator.

Control systems of the aforementioned type are known. However, even in control systems of this kind which utilize a pilot control value, the control dynamics of the system are limited, since if the setpoint value suddenly changes, the entire system deviation is present at the controller input. This causes the actual value to overshoot considerably beyond the intended setpoint. This problem is exacerbated when the controller signal has an integral component.

Thus, there is a need to optimize a control system with a pilot controller such that the actuator can quickly approach new setpoints without overshooting the intended setpoints.

SUMMARY OF THE INVENTION

In accordance with the present invention, such optimization is accomplished by continuously determining an expected value of the actual value based on the pilot controller in a model control loop. A reference value determined from this expected value is then delivered to the controller as the setpoint.

As a result, the control difference (i.e., the difference between setpoint value and actual value) becomes very small and ideally is equal to zero. The control amplification can thus be selected so that the control system quickly responds to changes in parameters. At the same time, the pilot controller ensures that the dynamics of the control system remain high.

The model control loop of the present invention can comprise a linear or nonlinear controlled system model, depending on the controlled system being simulated. Nonlinear controlled systems can be modeled better if the model control loop has a nonlinear controlled system model thereby improving control performance.

If the expected value is continuously compared with (e.g., subtracted from) an externally definable guide value, and the controller manipulated variable is applied onto (e.g., added to) the pilot control value, as long as the expected value is not equal to the guide value (in which case their difference would be zero) the pilot control value is defined as a function of the difference between guide value and expected value. As a result, with the correct controlled system model, the pilot controller approaches the guide value without activating the controller, to the full extent rather than just partly.

If operation is selected so that the expected value tracks the guide value as quickly as possible, and especially without overshooting, the guide value can be approached with optimum timing.

If the actuator reacts to the manipulated variable (i.e., the difference between the reference value and the actual value) with a time delay, accounting for the time delayed reaction of the actuator in the model control loop when determining the reference value advantageously prevents any difference between the reference value and actual value. This prevents the controller from intervening improperly in the control process during pilot controlling. Intervention by the controller is especially troublesome if the controller has an integrating component because the integrating component of the controller integrates a control difference that must be broken down again at the end of the pilot control process which can cause the actual value to overshoot.

Further, at least partly accounting for the effects of measured data acquisition and/or measured data preparation and/or calculation overhead time advantageously prevents any difference between the reference value and the actual value when determining the reference value.

If the time delay is accounted for, at least partly, only after the expected value has been determined, the pilot controller will be switched off at just the right time before the guide value is reached. Thus, despite the delayed reaction of the actuator, the actual value will not overshoot beyond the guide value.

The control system according to the present invention is especially advantageous when the system includes a plurality of individual control systems that mutually influence one another based on their technological effect and if the guide values, reference values, actual values, and controller manipulated variables of the individual control systems are transformed to decouple the individual control systems from one another. To account for nonlinear load correlations, the pilot control values, expected values, and reference values are determined using untransformed variables. The pilot control values are therefore applied directly onto the untransformed controller manipulated variables.

BRIEF DESCRIPTION OF THE DRAWINGS

FIG. 3 is a schematic of the internal configuration of the pilot controller of the present invention.

DETAILED DESCRIPTION

Figure 1:
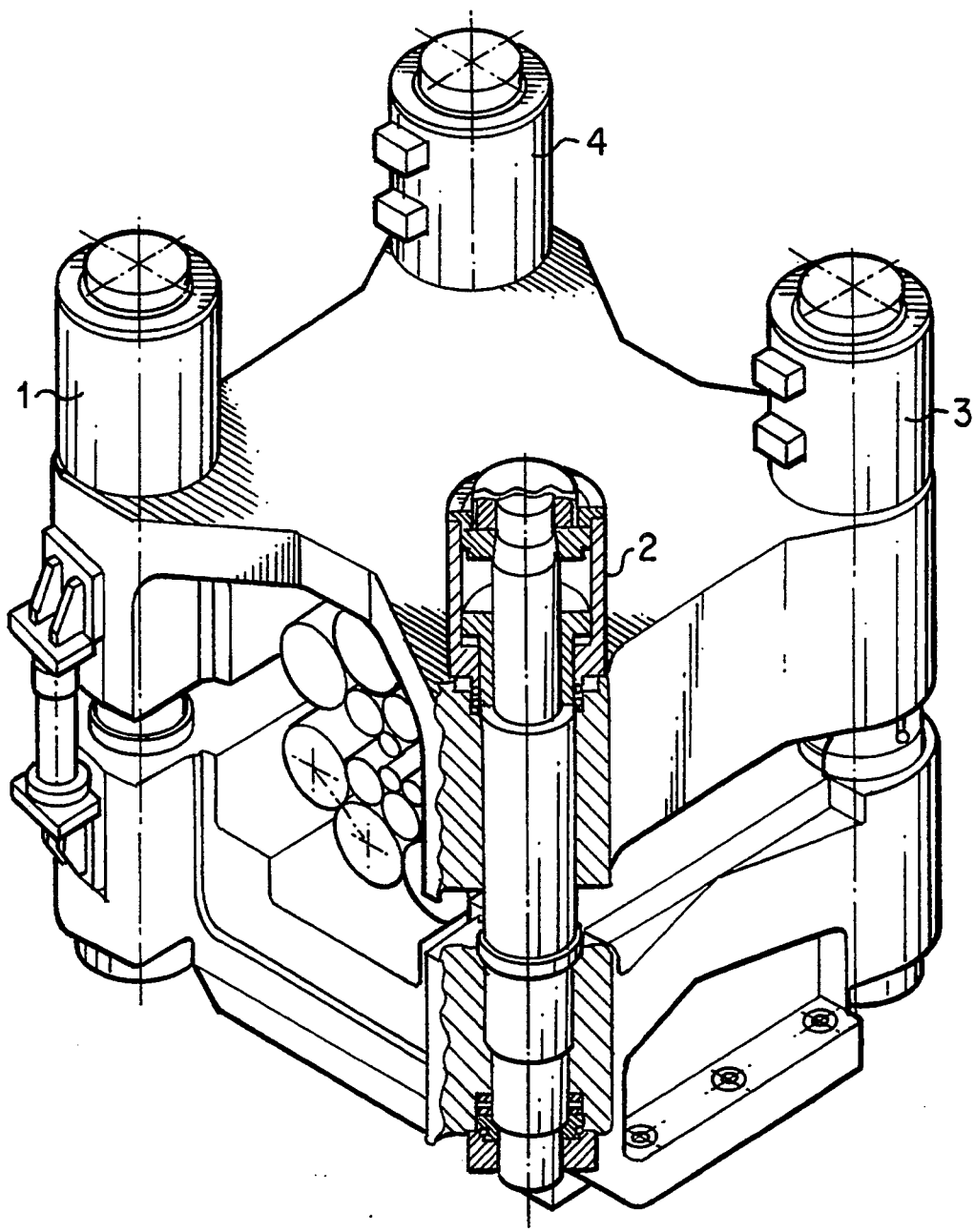
FIG. 1 is a perspective, partial cut-away view of a twenty-roll roll stand having independent hydraulic cylinders which may be advantageously controlled by the control system of the present invention.

In FIG. 1, a twenty-roll roll stand is configured so that screw-down center point $x_M$, screw-down tilt $x_S$ and synchronizations $x_{G12}$ and $x_{G34}$ are set by the four hydraulic cylinders in columns 1 to 4. The screw-down center point $x_M$ is equal to the average of screw-down readings $x_1$ to $x_4$ on columns 1 to 4. Screw-down tilt $x_S$ is equal to the average of screw-down readings $x_1$ and $x_2$ on columns 1 and 2, less the average of screw-down readings $x_3$ and $x_4$ on columns 3 and 4. Left-side synchronization $x_{G12}$ is equal to the difference between screw-down readings $x_1$ and $x_2$ on columns 1 and 2. Similarly, right-side synchronization $x_{G34}$ is equal to the difference between the screw-down readings $x_3$ and $x_4$ on columns 3 and 4.

The overall control system for the roll stand thus clearly consists of a plurality of individual control systems each of which influence system level parameters and one another. However, to decouple the influence of the individual control systems as much as possible from one another, the roll stand is not regulated by directly controlling the four screw-down travels $x_1$ to $x_4$. Instead, the roll stand's screw-down center point $x_M$ and screw-down tilt $x_S$ and its synchronizations $x_{G12}$ and $x_{G34}$ are controlled.

The individual control systems 9 (others not shown) supply controller manipulated variables $\Delta V_M^*$, $\Delta V_S^*$, $\Delta V_{G12}^*$, and $\Delta V_{G34}^*$. Controller manipulated variables $\Delta B_1^*$ to $\Delta V_4^*$ for the individual columns 1 to 4 are determined by transforming the controller manipulated variables supplied by the individual control systems 9.

Figure 2:
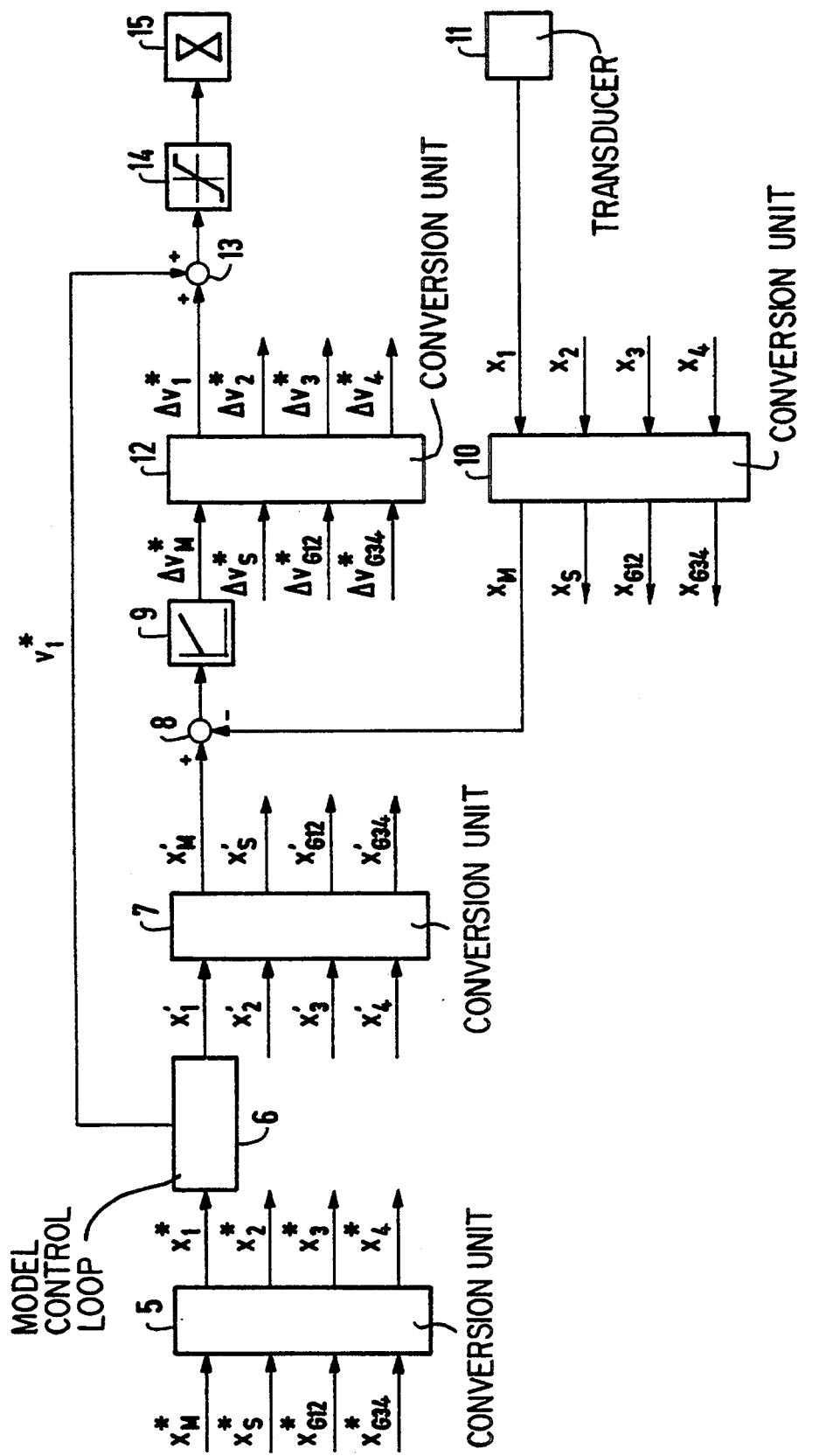
FIG. 2 is a schematic of a control system with pilot controller according to the present invention.

FIG. 2 exemplifies the present invention by showing a configuration of the control system for a twenty-roll roll stand. Guide values $x_M^*$, $x_S^*$, $x_{G12}^*$, and $x_{G34}^*$ for screw-down center point $x_M$ and screw-down tilt $x_S$ and for synchronizations $x_{G12}$ and $x_{G34}$ are externally supplied to the control system.

These values $x_M^*$, $x_S^*$, $x_{G34}^*$ are converted by conversion unit 5 into guide values $x_1^*$ to $x_4^*$ for screw-down travels $x_1$ to $x_4$ of hydraulic cylinders 1 to 4. The conversion taking place in the conversion unit 5 determines the four variables $x_1^*$ to $x_4^*$ based on the four independent equations set forth above. Known hardware components arranged based on solutions to the four independent equations may be employed to perform such a conversion.

In model control loop 6, a pilot control value $v_1^*$ for hydraulic cylinder 1 and a reference value $x_1'$ for controller 9 are determined from guide value $x_1^*$, and an expected value $x_1''$ (to be explained further with reference to FIG. 3) and by considering the physical limits of the control system and the controlled system. Pilot control values $v_2^*$ to $v_4^*$ for hydraulic cylinders 2 to 4, and reference values $x_2'$ to $x_4'$, are similarly determined in further model control loops (not depicted in FIG. 2 for the sake of clarity).

Reference values $x_x'$ to $x_4'$ determined by means of the model control loops are converted by conversion unit 7 into reference values $x_M'$, $x_S'$, $x_{G12}'$, and $x_{G34}'$ for screw-down center point $x_M$ and screw-down tilt $x_S$, and for synchronizations $x_{G12}$ and $x_{G34}$. Reference values $x_M'$, $x_S'$, $x_{G12}'$, and $x_{G34}'$ transformed in this manner are then delivered to the controllers as setpoints. Again, in the interest of clarity, FIG. 2 depicts only controller 9, to which reference value $x_M'$ is delivered via subtractor 8.

Controller 9 receives, via subtractor 8, as its actual value, the actual value $x_M$ of the screw-down center point, which was determined in conversion unit 10 from screw-down actual values $x_1$ to $x_4$. Screw-down actual values $x_1$ to $x_4$ are supplied by transducers, of which only transducer 11 for screw-down travel $x_1$ is depicted for the sake of clarity.

Based on the difference between reference value $x_M'$ and actual value $x_M$ determined by the subtractor 8, controller 9, which in the present case is a P (i.e., proportional) or PI (i.e., proportional, integral) controller, delivers a controller manipulated variable $\Delta V_M^*$ to change the setpoint of the screw-down center point $x_M$. In conversion unit 12, controller manipulated variables $\Delta V_M^*$, $\Delta V_S^*$, $\Delta V_{G12}^*$ and $\Delta V_{G34}^*$ are converted into controller manipulated variables $\Delta V_1^*$ to $\Delta V_4^*$ for hydraulic cylinders 1 to 4.

At adder 13, pilot control value $V_1^*$ supplied by the model control loop 6 is applied onto (e.g., added to) controller manipulated variable $\Delta V_1^*$. The sum of these two values $v_1^* + \Delta V_1^*$ passes through limiter 14 and is then delivered as the actual manipulated variable to regulator 15, which together with hydraulic cylinder 1 acts as an actuator. Pilot control values $V_2^*$ to $V_4^*$ are similarly applied onto controller manipulated variables $\Delta V_2^*$ to $\Delta V_4^*$. However, this portion of the circuit was also not depicted in the interest of greater clarity.

FIG. 3 illustrates the internal configuration of model control loop 6, which calculates pilot control value $v_1^*$, expected value $x_1''$, and reference value $x_1'$.

Model control loop 6 simulates the controlled system consisting of actuator 1 (shown as 15 in FIG. 2). The model control loop 6 further includes a simulated feedback of actual value $x_1$, which in model control loop 6 is returned in the form of expected value $x_1''$. Specifically, at subtractor 16, the model control loop 6 generates the difference between the guide value $x_1^*$ supplied by the conversion unit 5 and the expected value $x_1''$. In functional element 17, this generated difference is amplified and limited in accordance with the physical limits of the system such as the maximum possible displacement velocity of hydraulic cylinder 1, and the calculation clock cycle in model control loop 6 for example. As a result, expected value $x_1''$ tracks guide value $x_1^*$ in a time-optimized manner, i.e., as quickly as possible with no overshoot.

The output signal of functional element 17 is used, among other purposes, as pilot control value $v_1^*$ for regulator 15 of hydraulic cylinder 1. In addition, output signal $v_1^*$ of functional element 17 is delivered to functional element 18, the operation of which will be explained in greater detail below.

The output signal of functional element 18 is the expected displacement velocity $v_1'$ of the piston of hydraulic cylinder 1. The expected displacement velocity $v_1'$ is integrated in integrator 19 to yield the piston displacement or travel. The elastic deflection between a hydraulic piston and a measurement point (i.e., the point at which screw-down travel $x_1$ is measured) is also subtracted at subtractor 20. The elastic deflection is based on the force $F_1$ existing in hydraulic cylinder 1 and the resulting elasticity constant $C_1$ of the mechanism between piston and measurement point.

The expected value $x_1''$ obtained thereby is fed back to the input of model control loop 6 at subtractor 16.

Before the expected value $x_1''$ is output by model control loop 6, "parasitic response characteristics" are accounted for in filter 21. Parasitic response characteristics include, for example, the delayed reaction of actuator 1, 15 to a control command, delays in measured data acquisition, overhead time for measured data preparation, calculation overhead time, etc. Accounting for parasitic response characteristics ensures that reference value $x_M'$ delivered to controller 9 is equal, on a time-averaged basis, to actual value $x_M$. If the parasitic response characteristics are negligible in a specific case, filter 21 may be removed so that expected value $x_1''$ itself can be used as the reference value $x_1'$.

In the exemplified embodiment, the expected value $x_1''$ is fed back before parasitic response characteristics are accounted for so that the pilot controller is switched off at the correct time before actual value $x_1$ reaches guide value $x_1^*$. Otherwise actual value $x_1$ would overshoot guide value $x_1^*$. The functional element 18 accounts for the load correlation of displacement velocity $v_1$. Functional element 18 is designed so that below a load-dependent modulation limit it acts as an amplifier with an amplification factor of 1, and above that limit as a limiter. The load-dependent modulation limit is calculated as a function of pilot control value $v_1^*$, piston cross section $A_1$ of hydraulic cylinder 1, pressure $P_1$ of the hydraulic oil used in the hydraulic cylinder 1, change in pressure over time $P°$, and the rigidity of the mechanism $q_L$. The load-dependent modulation limit is thus modified based on the magnitude of the load and the direction of the displacement.

Because the load correlation of the displacement velocity $v_1$ of the hydraulic piston is accounted for only above the modulation limit of operating element 18, the model control loop 6 will remain stable.

Ideally, the controlled system model located between functional element 17 and conversion unit 7 (see FIG. 2) is designed so that it exactly simulates the behavior of the controlled system. However, this ideal situation normally cannot be achieved. It is nevertheless sufficient if the reference value $x_M'$ (or $x_S'$, $x_{G12}'$, or $x_{G34}'$) is equal, on a time-averaged basis, to actual value $x_M$ (or $x_S$, $x_{G12}$, or $x_{34}$, respectively), since then the controller merely needs to control out the residual discrepancies. The control system can therefore be designed for quick response and control dynamics are guaranteed by the pilot controller. With the control system according to the present invention, new guide values $x_M^*$, $x_S^*$, $x_{G12}^*$, and $x_{G34}^*$ can be approached much more quickly, especially when changes in guide value are small.

To adapt the controlled system model as closely as possible to the controlled system being simulated, the controlled system model should be configured as a self-adapting controlled system model. Adaptation of the control system model can occur in a manner known in the art.

What is claimed is:

1. A control system for controlling a process, said control system being externally supplied with a guide value, and comprising:
   a) an actuator having an input;
   b) a transducer adapted to measure an actual value of said process and having an output adapted to provide said measured actual value;
   c) a controller, said controller
      i) having a first input, and a second input, said second input being coupled to said output of said transducer,
      ii) adapted to determine a controller manipulated variable based on its inputs, and
      iii) having an output adapted to provide said controller manipulated variable;
   d) a model control loop, said model control loop
      i) having an input adapted to accept said guide value,
      ii) adapted to determine a pilot control value based on said guide value and a predetermined expected value,
      iii) adapted to continuously determine an expected value for said actual value, said expected value being based on said pilot control value,
      iv) adapted to determine a reference value from said expected value, and
      v) having a first output adapted to provide said determined pilot control value, and a second output adapted to provide said determined reference value, said second output being coupled with said first input of said controller; and
   e) an adder, said adder
      i) having a first input being coupled to said output of said controller, and a second input being coupled with said first output of said model control loop,
      ii) adapted to add said pilot control value onto said controller manipulated variable to determine an actuator signal, and
      iii) having an output adapted to provide said actuator signal and being coupled to said input of said actuator.

2. The control system of claim 1, wherein said model control loop comprises a functional element which is a nonlinear model of the system being controlled, said functional element having an input adapted to accept said pilot value and an output adapted to provide said expected value.

3. The control system of claim 1, wherein said model control loop comprises a functional element which is a linear model of the system being controlled, said functional element having an input adapted to accept said pilot value and an output adapted to provide said expected value.

4. The control system of claim 1, said model control loop
   vi) being adapted to continuously compare said expected value $(x_1'')$ with said guide value $(x_1^*)$, and
   vii) being adapted to define said pilot control value as a function of the difference between said guide value $(x_1^*)$ and said expected value $(x_1'')$,
wherein said controller manipulated variable $(\Delta V_1^*)$ is applied onto said pilot control value $(v_1^*)$ by said adder as long as the expected value $(x_1'')$ is not equal to the guide value $(x_1^*)$.

5. The control system of claim 4, wherein said model control loop further includes a functional element, said functional element being selected so that the expected value $(x_1'')$ tracks the guide value $(x_1^*)$ as quickly as possible.

6. The control system of claim 5, wherein said functional element is further selected so that the expected value $(x_1'')$ tracks the guide value $(x_1^*)$ without overshooting.

7. The control system of claim 6, wherein said functional element comprises an amplifier and a limiter.

8. The control system of claim 5, wherein said functional element is further selected so that the expected value $(x_1'')$ tracks the guide value $(x_1^*)$ without overshooting.

9. The control system of claim 1, being used in a system having parasitic response characteristics, wherein said control system further comprises:
   f) a filter element, said filter element at least partly accounting for said parasitic response characteristics when said reference value $(x_1')$ is determined by said model control loop,
whereby any difference between said reference value $(x_1')$ and said actual value $(x_1)$ are prevented.

10. The control system of claim 9 wherein said parasitic response characteristics include at least one of measured data acquisition time delays, measured data preparation time delays, and calculation overhead time.

11. The control system of claim 9 wherein said filter element at least partly accounts for said parasitic response characteristics only after said expected value $(x_1'')$ has been determined.

12. The control system of claim 1 wherein said model control loop comprises a functional element, said functional element accounting for any load existing on said actuator when said model control loop is determining said expected value $(x_1'')$.

13. The control system of claim 12, wherein said functional element determines an expected load-dependent displacement velocity ($v_1'$) of said actuator from the pilot control value ($v_1^*$).

14. The control system of claim 13, wherein said functional element determines a load dependent modulation limit based on at least one of load and direction, acts as an amplifier with an amplification of 1 below said load dependent modulation limit such that said expected displacement velocity ($v_1'$) is equal to said pilot control value ($v_1^*$), and acts as a limiter above said load dependent modulation limit such that said pilot control value ($v_1^*$) is limited to said load dependent modulation limit.

15. The control system of claim 12 wherein said functional element accounts for load-related shifts in said actual value when determining said reference value ($x_1'$), whereby a control error is prevented.

16. The control system of claim 15, wherein said functional element at least partially accounts for load-related shifts in said actual value before said expected value ($x_1''$) is determined.

17. The control system of claim 1 wherein said model control loop comprises a self-adapting controlled system model.

18. The control system of claim 1 being externally supplied with at least one further guide value, and further comprising:

f) at least one further actuator having an input;

g) at least one further transducer adapted to measure a further actual value of said process and having an output adapted to provide said further measured actual value;

h) at least one further controller, said further controller
 i) having a first input, and a second input, said second input being coupled to said output of said further transducer,
 ii) adapted to determine a further controller manipulated variable based on its inputs, and
 iii) having an output adapted to provide said further controller manipulated variable;

i) at least one further model control loop, said further model control loop
 i) having an input adapted to accept said further guide value,
 ii) adapted to determine a further pilot control value based on said further guide value and a further predetermined expected value,
 iii) adapted to continuously determine a further expected value for said further actual value, said further expected value being based on said further pilot control value,
 iv) adapted to determine a further reference value from said further expected value, and
 v) having a first output adapted to provide said determined further pilot control value, and a second output adapted to provide said determined further reference value, said second output being coupled with said first input of said further controller;

j) at least one further adder, said further adder
 i) having a first input being coupled to said output of said further controller, and a second input being coupled with said first output of said further model control loop,
 ii) adapted to add said further pilot control value onto said further controller manipulated variable to determine a further actuator signal, and
 iii) having an output adapted to provide said further actuator signal and being coupled to said input of said further actuator;

k) a first conversion unit, said first conversion unit
 i) being coupled between said second outputs of said model control loop and further model control loop and said first inputs of said controller and further controller, and
 ii) being adapted to transform said reference value and further reference value ($x_1'$ to $x_4'$) into transformed reference values ($x'_m$, $x'_s$, $x'_{G12}$, $x'_{G34}$);

l) a second conversion unit, said second conversion unit
 i) being coupled between said transducer and further transducer and said second inputs of said controller and further controller, and
 ii) being adapted to transform said actual value and further actual value ($x_1$ to $x_4$) into transformed actual values ($x_M$, $x_S$, $x_{G12}$, $x_{G34}$); and m) a third conversion unit, said third conversion unit
 i) being coupled between said outputs of said controller and further controller and said first inputs of said adder and further adder, and
 ii) being adapted to retransform transformed controller manipulated variables ($\Delta V_M^*$, $\Delta V_S^*$, $\Delta V_{G12}^*$, $\Delta V_{G34}^*$) outputted by said controller and further controller into untransformed controller manipulated variables ($\Delta V_1^*$ to $\Delta V_4^*$), whereby any mutually influence between said controller and said at least one further controller, based on their technological effect, is decoupled.

19. The control system of claim 26, wherein said pilot control value and further pilot control value ($v_1^*$ to $v_4^*$), expected value and further expected value ($x_1''$ to $x_4''$), and reference value and further reference value ($x_1'$ to $x_4'$) are determined using untransformed variables 20. The control system of claim 19, wherein said the pilot control value and further pilot control value ($v_1^*$ to $v_4^*$) are added directly onto the retransformed controller manipulated variable and further controller manipulated variable ($\Delta v_1^*$ to $\Delta v_4^*$).

21. The control system of claim 1, being used in a system in which said actuator reacts to the resulting value of said adder ($v_1^* + \Delta v_1^*$) with a time delay, wherein said control loop further accounts for said time delayed reaction of said actuator when determining said reference value ($x_1'$(, whereby differences between said reference value ($x_1'$) and said actual value ($x_1$) are prevented.

22. A hydraulic screw-down control system for a roll stand having four hydraulic cylinders, each having a screw down reading ($x_1$–$x_4$), said roll stand having a screw-down center point ($x_m$), a screw-down tilt ($x_s$), and synchronizations ($x_{G12}$, $x_{G34}$) being defined by said screw down readings, said hydraulic screw-down control system being supplied with externally supplied guide values and comprising:

a) a hydraulic actuator assigned to each of said four hydraulic cylinders, each of said hydraulic actuators having an input;

b) a transducer assigned to each of said four hydraulic cylinders and being adapted to measure an actual value of said screwdown reading of a corresponding one of said hydraulic cylinders and having an output adapted to provide said measured actual value;

c) a controller assigned to each of said four hydraulic cylinders, each of said controllers
   i) having a first input and a second input, said second input being coupled to a corresponding one of said transducers,
   ii) adapted to determine a controller manipulated variable based on its inputs, and
   iii) an output adapted to provide said controller manipulated variable;

d) a model control loop assigned to each of said hydraulic cylinders, each of said model control loop
   i) having an input adapted to accept said guide value,
   ii) adapted to determine a pilot control value based on its input and a predetermined expected value,
   iii) adapted to continuously determine an expected value for an actual value, said expected value being based on said pilot control value, and
   iv) adapted to determine a reference value from said expected value, and
   v) having a first output adapted to provide said determined pilot control value, and a second output adapted to provide said determined reference value and being coupled to said first input of a corresponding one of said controllers; and e) an adder assigned to each of said hydraulic cylinders, each of said adders
   i) having a first input being coupled with said output of a corresponding one of said controllers, and a second input being coupled with said first output of a corresponding one of said model control loops,
   ii) adapted to add said pilot control value onto said controller manipulated variable to determine said actuator signal, and
   iii) having an output adapted to provide said actuator signal and being coupled with said input of a corresponding one of said actuators.

23. The hydraulic screw-down control system of claim 22 wherein said roll stand is a twenty-roll roll stand.

24. The hydraulic screw-down control system of claim 22 further comprising:

e) a first conversion unit (5) assigned to each of said hydraulic cylinders, each of said first conversion units
   i) having an input adapted to accept said guide values of said screw-down center point ($x_m$), said screw-down tilt ($x_s$), and said synchronizations ($x_{G12}$, $x_{G34}$),
   ii) adapted to determine to said screw down readings ($x_1$–$x_4$) from its inputs, and
   iii) having an output adapted to provide said screw down readings and being coupled to said input of a corresponding one of said model control loops;

f) a second conversion unit assigned to each of said hydraulic cylinders, each of said second conversion units
   i) having an input adapted to accept said reference values of said screw down readings and being coupled to said second output of a corresponding one of said model control loops,
   ii) adapted to determine reference values of said screw-down center point, said screw-down tilt, and said synchronizations based on its inputs, and
   iii) having an output adapted to provide said reference values of said screw-down center point, said screw-down tilt, and said synchronizations and being coupled to said first input of a corresponding one of said controllers;

g) a third conversion unit assigned to each of said hydraulic cylinders, each of said third conversion units
   i) having an input adapted to accept said controller manipulated values of said screw-down center point, said screw-down tilt, and said synchronizations and being coupled to said output of a corresponding one of said controllers,
   ii) being adapted to determine controller manipulated values of said reference values of said screw down readings based on its input, and
   iii) having an output being adapted to provide controller manipulated values of said reference values of said screw down readings and being coupled to said first input of a corresponding one of said adders; and h) a fourth conversion unit assigned to each of said hydraulic cylinders, each of said fourth conversion units
   i) having an input adapted to accept said actual values of said reference values of said screw down readings and being coupled to a corresponding one of said transducers,
   ii) being adapted to determine actual values of said screw-down center point, said screw-down tilt, and said synchronizations based on its input, and
   iii) having an output adapted to provide said actual values of said screw-down center point, said screw-down tilt, and said synchronizations and being coupled to said input of a corresponding one of said actuators.

25. In a system having a transducer for measuring an actual value and a actuator, and being provided with a guide value, a control method comprising the steps of:
   a) subtracting a predetermined expected value from said guide value to determine a pilot control value;
   b) continuously applying said pilot control value determined in step (a) to a functional element which models the system to determine an expected value of said actual value;
   c) determining a reference value based on said expected value determined in step (b);
   d) subtracting said actual value measured by the transducer from said reference value determined in step (c) to determine a controller manipulated value;
   e) adding said controller manipulated value determined in step (d) and said pilot control value determined in step (a) to determine an input value for said actuator which is applied to said actuator for controlling its operation.

* * * * *